US012697878B2

(12) United States Patent
Kodappully et al.

(10) Patent No.: US 12,697,878 B2
(45) Date of Patent: Aug. 4, 2026

(54) SYSTEMS AND METHODS FOR PROVIDING A STEER-BY-BRAKE PERFORMANCE CAPABILITY ESTIMATION

(71) Applicant: STEERING SOLUTIONS IP HOLDING CORPORATION, Saginaw, MI (US)

(72) Inventors: Sarin Kodappully, Midland, MI (US); Alexander Jennings, Bath, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 84 days.

(21) Appl. No.: 18/758,064

(22) Filed: Jun. 28, 2024

(65) Prior Publication Data

US 2026/0001403 A1 Jan. 1, 2026

(51) Int. Cl.
*B60K 35/28* (2024.01)
*B62D 9/00* (2006.01)

(52) U.S. Cl.
CPC ........ *B60K 35/28* (2024.01); *B60K 2360/162* (2024.01); *B62D 9/005* (2013.01)

(58) Field of Classification Search
None
See application file for complete search history.

(56) References Cited

U.S. PATENT DOCUMENTS

| | | | | |
|---|---|---|---|---|
| 12,195,082 | B2 * | 1/2025 | Schumann | B62D 15/025 |
| 2022/0111895 | A1 * | 4/2022 | Schumann | B60W 40/114 |
| 2023/0055296 | A1 * | 2/2023 | LaBarbera | B60T 8/1755 |
| 2023/0119160 | A1 * | 4/2023 | Labarbera | B60T 8/92 701/70 |
| 2023/0124821 | A1 * | 4/2023 | Labarbera | B60T 8/1755 701/41 |
| 2024/0359732 | A1 * | 10/2024 | Kim | B62D 5/0484 |

FOREIGN PATENT DOCUMENTS

| | | | | |
|---|---|---|---|---|
| DE | 102018212804 A1 * | 2/2020 | | B60T 8/17557 |
| DE | 102022114959 A1 * | 12/2023 | | B60W 10/20 |

* cited by examiner

*Primary Examiner* — Justin S Lee
(74) *Attorney, Agent, or Firm* — Dickinson Wright PLLC

(57) ABSTRACT
A method for vehicle steering control includes estimating a target steering metric using at least one vehicle signal associated with a vehicle, the target steering metric being associated with a requested steering maneuver. The method also includes estimating an instantaneous steer-by-brake metric using the at least one vehicle signal, and determining whether a steer-by-brake function of a steering system of the vehicle can achieve the target steering metric based on the target steering metric and the instantaneous steer-by-brake metric. The method also includes calculating a steer-by-brake capability status of the steer-by-brake function, and, in response to a determination that the steer-by-brake function can achieve the target steering metric generating a first steer-by-brake capability indication, and providing the first steer-by-brake capability indication.

20 Claims, 7 Drawing Sheets

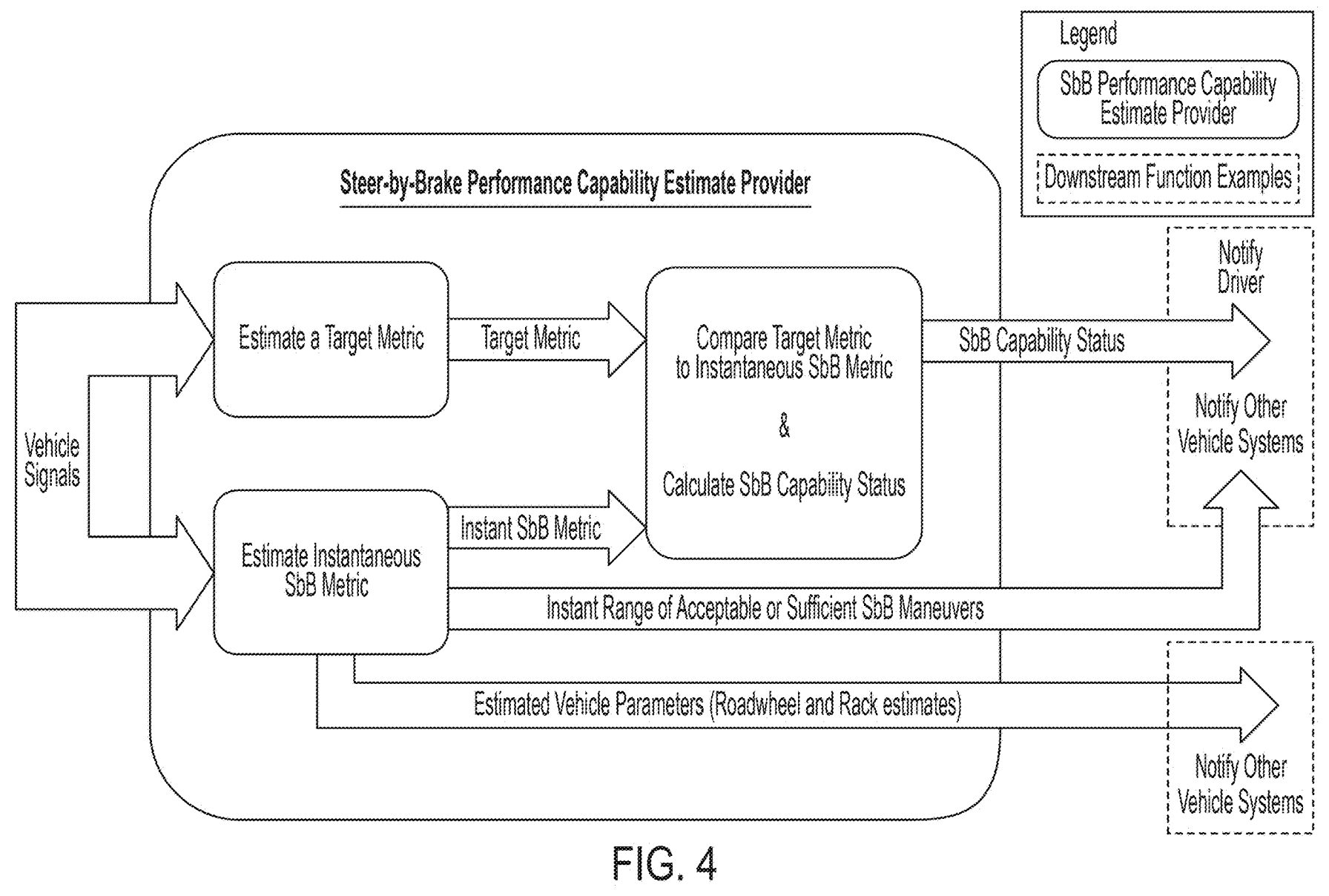

Legend

SbB Performance Capability Estimate Provider

Downstream Function Examples

Notify Driver

Notify Other Vehicle Systems

Notify Other Vehicle Systems

Steer-by-Brake Performance Capability Estimate Provider

SbB Capability Status

Compare Target Metric to Instantaneous SbB Metric

&

Calculate SbB Capability Status

Target Metric

Instant SbB Metric

Instant Range of Acceptable or Sufficient SbB Maneuvers

Estimated Vehicle Parameters (Roadwheel and Rack estimates)

Estimate a Target Metric

Estimate Instantaneous SbB Metric

Vehicle Signals

FIG. 4

Physics-Based Mathematical Model for the SbW Vehicle Use Case (Includes FBD and fundamental equations)

$$M_{y,Resist} = \delta * k + \dot{\delta} * b$$

$$1.\ \Sigma M = \ddot{\delta} I_{zz}, WheelRackSystem = Fx * SR - Fy * Trail - M_{y,\ Resist}$$

Use this to solve for roadwheel angle, $\delta$

2. $F_{y,front} * \cos(\delta) + F_{y,rear} = ma_y$

3. $F_{y,front} * \cos(\delta) * l_a - F_{y,rear} * l_b + M_{Brkfrnt} + M_{BrkRear} = \ddot{\Theta} I_{zz,Vehicle}$ Use 3. to solve for vehicle yaw rate estimate $(\dot{\Theta})$ with SbB after solving Eq 1. in for $\delta$

SYSTEMS AND METHODS FOR PROVIDING A STEER-BY-BRAKE PERFORMANCE CAPABILITY ESTIMATION

TECHNICAL FIELD

This disclosure related to steering systems, and, in particular, to systems and methods for providing a steer-by-brake performance capability estimation.

BACKGROUND

Vehicles, such as cars, trucks, sport utility vehicles, crossovers, mini-vans, marine craft, aircraft, all-terrain vehicles, recreational vehicles, or other suitable vehicles, include a steering system, such as an electronic power steering (EPS) system, a steer-by-wire (SbW) steering system, a hydraulic steering system, or other suitable steering system. The steering system typically includes one or more controllers that control various aspects of the steering system including, but not limited to, controlling one or more electric motors and/or one or more actuators of the steering system.

SUMMARY

This disclosure relates generally to steering systems.

An aspect of the disclosed embodiments includes a method for vehicle steering control. The method includes estimating a target steering metric using at least one vehicle signal associated with a vehicle, the target steering metric being associated with a requested steering maneuver. The method also includes estimating an instantaneous steer-by-brake metric using the at least one vehicle signal, and determining whether a steer-by-brake function of a steering system of the vehicle can achieve the target steering metric based on the target steering metric and the instantaneous steer-by-brake metric. The method also includes calculating a steer-by-brake capability status of the steer-by-brake function, in response to a determination that the steer-by-brake function can achieve the target steering metric generating a first steer-by-brake capability indication, and providing the first steer-by-brake capability indication.

Another aspect of the disclosed embodiments includes a system for vehicle steering control. The system includes a processor, and a memory. The memory includes instructions that, when executed by the processor cause the processor to: estimate a target steering metric using at least one vehicle signal associated with a vehicle, the target steering metric being associated with a requested steering maneuver; estimate an instantaneous steer-by-brake metric using the at least one vehicle signal; determine whether a steer-by-brake function of a steering system of a vehicle can achieve the target steering metric based on the target steering metric and the instantaneous steer-by-brake metric; calculate a steer-by-brake capability status of the steer-by-brake function of a steering system of the vehicle; and, in response to a determination that the steer-by-brake function can achieve the target steering metric: generate a first steer-by-brake capability indication; and provide the first steer-by-brake capability indication.

Another aspect of the disclosed embodiments includes an apparatus for vehicle steering control. The apparatus includes a controller configured to: estimate a target steering metric using at least one vehicle signal associated with a vehicle, the target steering metric being associated with a requested steering maneuver; estimate an instantaneous steer-by-brake metric using the at least one vehicle signal;

determine whether a steer-by-brake function of a steering system of the vehicle can achieve the target steering metric based on the target steering metric and the instantaneous steer-by-brake metric; calculate a steer-by-brake capability status of the steer-by-brake function; in response to a determination that the steer-by-brake function can achieve the target steering metric, generate a first steer-by-brake capability indication; and, in response to a determination that the steer-by-brake function cannot achieve the target steering metric, generate a second steer-by-brake capability indication.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 4 generally illustrates a steer-by-brake capability estimation function according to the principles of the present disclosure.

DETAILED DESCRIPTION

Figure 1:
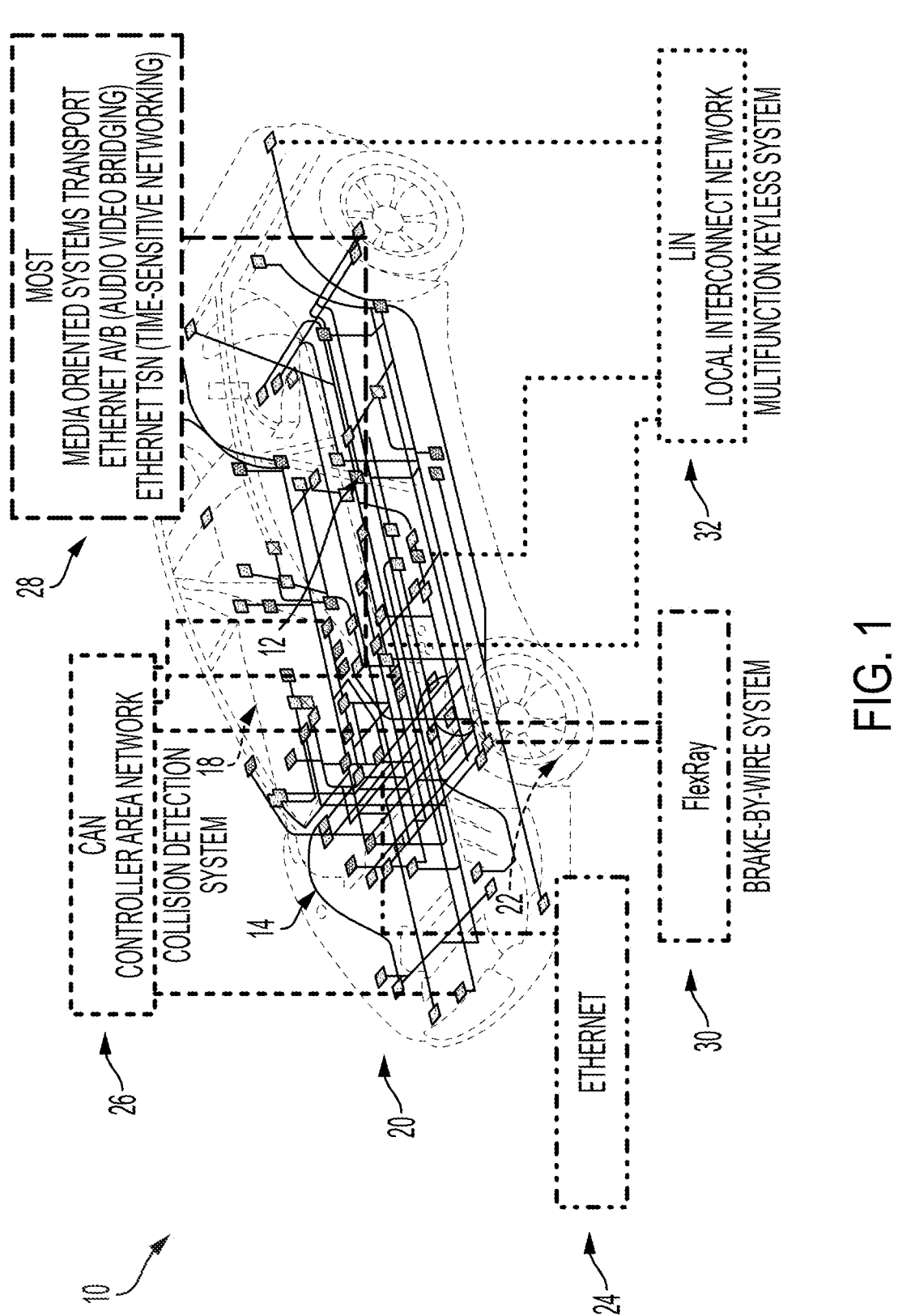
FIG. 1 generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, marine craft, aircraft, all-terrain vehicles, recreational vehicles, or other suitable vehicles, include a steering system, such as an EPS system, a SbW steering system, a hydraulic steering system, or other suitable steering system. The steering system typically includes one or more controllers that control various aspects of the steering system including, but not limited to, controlling one or more electric motors and/or one or more actuators of the steering system.

A vehicle steering system may be a connected steering system (e.g., a steering system with a mechanical connection between a handwheel and a rack) with power steering, or a SbW steering system (e.g., a steering system without a mechanical connection between the handwheel and the rack). A vehicle braking system may include various means to resist the motion of the vehicle, including frictional and electrical brakes. A powertrain system may include various means for propulsion, such as an internal combustion engine or electric motor, and various means for delivering torques, forces, or pressures from the propulsion system to individual tires, including transmissions, differentials and torque vectoring differentials. A load may include torques, forces, or pressures. A steering, braking, or powertrain system may include electronics, which allow such systems to send or receive signals and commands and convert received commands into loads within or generated by the system, and ultimately loads at the tires. A vehicle driver controls the motion of a vehicle and may include a human driver or an automated or autonomous driver directed by software.

During vehicle operation, a system, such as the steering system, may fail, which may include full or partial failure, or degradation. A steer-by-brake (SbB) system is a system that provides brake and powertrain commands to the brake and powertrain systems, based on driver intent information, in the event of a steering system failure, to assist the driver with lateral control. This may be applied in vehicles with connected EPS steering systems, or SbW steering systems. SbB may be applied in a vehicle with human driver or an automated, autonomous, or software controlled driver system. Driver intent may be determined from steering system signals, such as handwheel angle or handwheel torque, or additionally may be determined indirectly via vehicle inputs (e.g., vehicle lateral acceleration, yaw rate, and/or vehicle speed). A SbB system takes these driver intent inputs and outputs specific brake and powertrain commands to individual tires to create loads that can help the driver with lateral control of the vehicle.

SbB systems may, without limitation, improve vehicle handling, reduce steering efforts when a connected EPS steering system has failed, enable lateral control of a SbW steering system of a vehicle when the road wheel actuator has failed, and/or enable lateral control of an automated or autonomous vehicle with a connected EPS or SbW steering system when the steering system has failed.

In some driving scenarios with SbB active, SbB may be insufficient in achieving the performance or vehicle response that a driver is accustomed to. SbB may be insufficient in at least one of driver input handwheel torque reduction or lateral vehicle capability.

Additionally, or alternatively, when a driver commands a lateral vehicle maneuver, there are scenarios where SbB cannot prevent excessive steering effort or where SbB cannot achieve a requested lateral vehicle maneuver. During these scenarios, the driver and surrounding vehicle systems are not notified that SbB capability is insufficient. There may be instances where rack or roadwheel information may be difficult for surrounding vehicle systems to know or obtain while driving, especially during roadwheel actuator faults for a SbW system.

Accordingly, systems and methods, such as those described herein, configured to provided improved SbB features, may be desirable. In some embodiments, the systems and methods described herein may be configured to provide a software function that can enhance the SbB function as a product by providing a SbB performance capability estimate to surrounding vehicle systems, which may use the information to communicate the capability of the SbB function to the driver and other road users.

The systems and methods described herein may be configured to estimate the instantaneous SbB lateral capability using a physics-based mathematical model, which can estimate additional useful vehicle parameters for other vehicle dynamics systems. The systems and methods described herein may be configured to communicate when SbB may be insufficient in various metrics to at least one of a driver or other vehicle systems.

Figure 3:
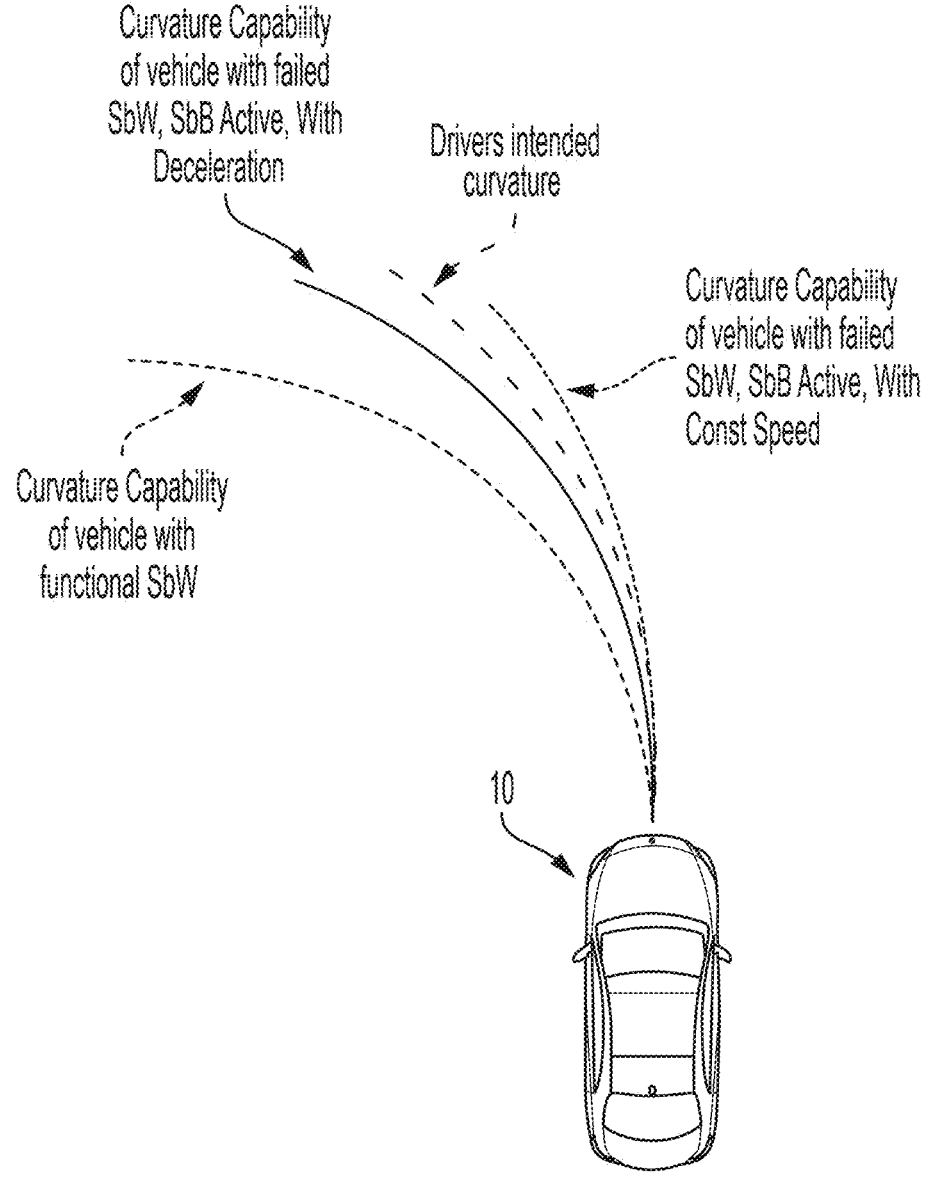
FIG. 3 generally illustrates a chart of vehicle maneuvers using a steer-by-brake function according to the principles of the present disclosure.

As is generally illustrated in FIG. 3, the systems and methods described herein may be configured to calculate the capability of the vehicle in different states, and compare that to the driver intent. The systems and methods described herein may be configured to determine whether the vehicle in SbB can achieve the driver intent, and if so what state or mode to place the SbB in, or what calibrations to use. The systems and methods described herein may be configured to maximize the potential of the vehicle to meet what the driver intends.

The systems and methods described herein may be configured to communicate the determination to the driver or other systems, which may allow for the limited response of the vehicle to be less surprising, and more intuitive, which may allow for better decision making by the driver or other systems.

As is generally illustrated in FIG. 3, the systems and methods described herein may be configured to calculate the capability of the vehicle in different states, and compare that to the driver intent. The systems and methods described herein may be configured to determine whether the vehicle in SbB can achieve the driver intent. If driver intent cannot be achieved in the current SbB state or configuration, the SbB system may use the indicators described herein to adjust the SbB state or configuration to get closer to the driver intent. The systems and methods described herein may be configured to maximize the potential of the vehicle to meet what the driver intent.

In some embodiments, the systems and methods described herein may be configured to communicate the determination to the driver or other systems, which may allow for the limited response of the vehicle to be less surprising (e.g., to the driver), and more intuitive, which may allow for better decision making by the driver or other systems.

In some embodiments, the systems and methods described herein may be configured to communicate the determination to within the SbB feature (e.g, such that the SbB decision making is improved). The SbB may be active and may be operating in a current state or mode, or with a current calibration. The systems and methods described herein may be configured to estimate the instantaneous SbB metric of the vehicle with SbB in a default or current state, mode, or calibration. The systems and methods described herein may be configured to compare the target metric to the instantaneous SbB metric to determine whether the target metric can be achieved, while SbB is operating in the current state, mode, or calibration. The systems and methods described herein may be configured to calculate and provide a status indicating the capability of SbB in the current state, mode, or calibration.

The systems and methods described herein may be configured to change the state, mode, or calibration of the SbB feature to an alternate state, mode, or calibration, based on the capability status or estimated vehicle parameter, described herein. For example, if the capability status indicates that SbB is not capable of achieving the target metric while SbB is in the current state, mode or calibration, SbB may switch to an alternate state, mode, or calibration with an increased capability. The systems and methods described herein may be configured to calculate the instantaneous SbB metric in the alternate state, mode, or calibration, and determine that SbB is capable of achieving the target metric, and calculate the appropriate SbB capability status. For example, if the systems and methods described herein determines that SbB is not capable of achieving the target metric while SbB is in the current state, mode or calibration, and the appropriate capability status is calculated, and there is not an available alternate state, mode, or calibration with an increased capability, SbB will remain in the current state, mode, or calibration, and the SbB capability status will continue to indicate that SbB is not capable of achieving the target metric. This SbB capability status may then be used by external systems to activate external features, such as execution of a MRM.

As is generally illustrated in FIG. 3, SbB may operate in a constant speed mode, in which SbB applies powertrain torque to compensate for the SbB brake commands, to compensate for unintended deceleration and attempt to hold constant speed during maneuvers that the driver intends to be purely lateral. SbB may operate in a deceleration mode, in which SbB does not apply powertrain torque to compensate for SbB brake commands, and allows the vehicle to decelerate. In this scenario, the intended curvature of the driver is greater than the capability of SbB in constant speed mode, but less than the capability of SbB in deceleration mode. Thus, the systems and methods described herein may be configured to switch SbB from constant speed mode to deceleration mode, so that the vehicle can still achieve the driver's intended curvature.

As is generally illustrated in FIG. 4, the systems and methods described herein may be configured to use a software function that enhances driver controllability and understanding of SbB capability. For example, the systems and methods described herein may be configured to estimate a target metric. The target metric may include at least one of a maximum allowable handwheel effort, a driver-desired lateral vehicle target, and a software-desired lateral vehicle target. The maximum allowable handwheel effort may indicate a threshold range of driver handwheel torque input, where, inside the range, is considered a comfortable or safe required input torque to achieve a maneuver and, outside the range, is considered an uncomfortable or unsafe required input torque to achieve a maneuver. The driver-desired lateral vehicle target may indicate a lateral vehicle response that a human driver desires based on various inputs. The driver-desired lateral vehicle target may include at least one of an intended vehicle yaw rate, an intended vehicle curvature, an intended vehicle lateral acceleration, an intended vehicle lateral jerk, an intended vehicle lateral velocity, and an intended vehicle position. The software-desired lateral vehicle target may indicate a lateral vehicle response that an automated, autonomous, or software-controlled system desires based on various inputs or commands. The software-desired lateral vehicle target may include at least one of an intended vehicle yaw rate, an intended vehicle curvature, an intended vehicle lateral acceleration, an intended vehicle lateral jerk, an intended vehicle lateral velocity, and an intended vehicle position.

The systems and methods described herein may be configured to calculate the target metric using various vehicle signals and methods. The vehicle signals may include handwheel angle, vehicle speed, handwheel torque, lateral acceleration, vehicle yaw rate, and vehicle longitudinal acceleration. Methods may include dynamic calculation using vehicle models and vehicle signals, dynamic thresholds based on vehicle signals, static thresholds based on parameter values, and based on empirical data.

The systems and methods described herein may be configured to estimate an instantaneous SbB metric. The instantaneous SbB metric may include at least one of instantaneous driver handwheel effort during SbB, instantaneous driver handwheel effort acceptable range, instantaneous driver handwheel effort unacceptable range, instantaneous SbB lateral vehicle capability, instantaneous SbB lateral vehicle capability sufficient range, and instantaneous SbW lateral vehicle capability insufficient range. Instantaneous driver handwheel effort during SbB may indicate the estimated driver handwheel torque input required to achieve the current maneuver while SbB is active. The instantaneous driver handwheel effort acceptable and unacceptable ranges may indicate ranges of SbB maneuvers that may yield acceptable and unacceptable driver handwheel efforts respectively. These ranges may be provided via a variety of terms including, but not limited to, handwheel angles, yaw rates, curvatures, and/or the like. The metrics may be estimated using models and calculation, empirical data, and/or may be estimated using real time sensor information, such as a handwheel torque sensor input and/or the like.

The instantaneous SbB lateral vehicle capability may indicate the maximum lateral vehicle capability that SbB can achieve. The instantaneous SbB lateral vehicle capability sufficient and insufficient ranges may indicate a range of SbB maneuvers that may yield sufficient and insufficient lateral vehicle capability with SbB active, respectively. The ranges may be provided via a variety of terms including, but not limited to, handwheel angles, vehicle yaw rates, vehicle lateral accelerations, vehicle curvatures, and/or the like. The metrics may be calculated using at least one of vehicle models and calculation, empirical data, and real time sensor information. The maximum lateral vehicle capability may be calculated in terms of at least one of intended vehicle yaw rate, intended vehicle curvature, intended vehicle lateral acceleration, intended vehicle lateral jerk, intended vehicle lateral velocity, an intended vehicle position.

Figure 5A:
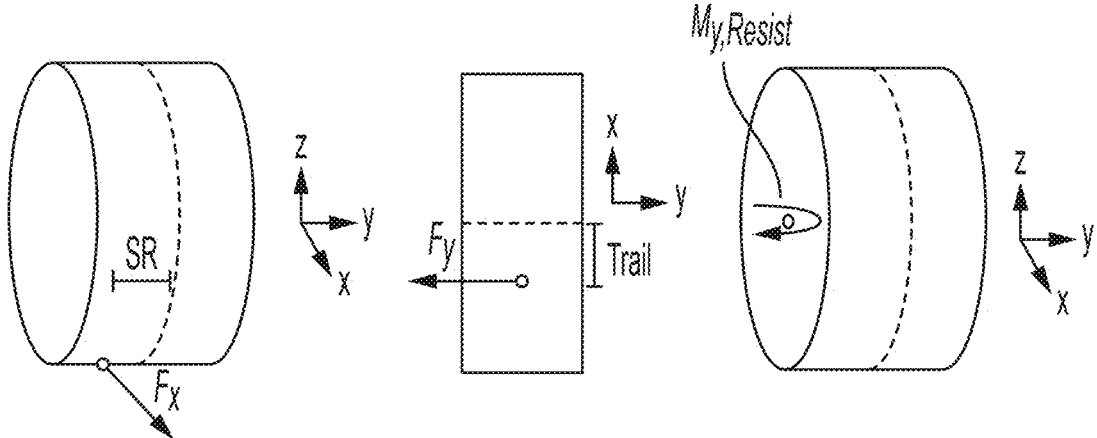
FIGS. 5A and 5B generally illustrate a mathematical model according to the principles of the present disclosure.
Figure 5B:
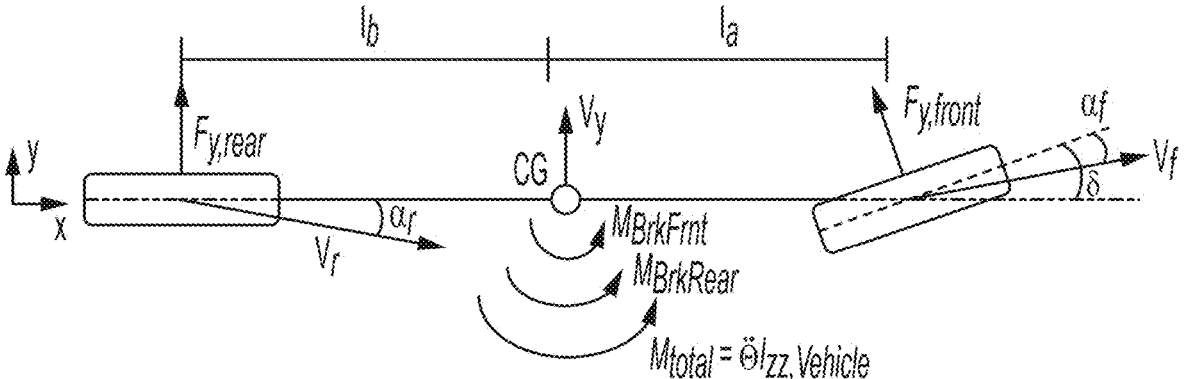

The systems and methods described herein may be configured to estimate the instantaneous SbB lateral vehicle capability using a physics-based mathematical model, as is generally illustrated in FIGS. 5A and 5B. The model may estimate additional useful vehicle parameters that may be provided to vehicle dynamics systems for a variety of purposes. The additional useful vehicle parameters may include at least one of front roadwheel angle, front roadwheel angular velocity, front roadwheel angular acceleration, steering rack position, steer rack velocity, steering rack acceleration, and steering rack friction and resistance force. The parameters may be especially difficult to estimate during a faulted, failed, or degraded roadwheel actuator in a SbW system without using the SbB function described herein. The other vehicle systems may include at least one of a handwheel actuator system, a brakes system, a centralized vehicle domain controller system, systems controlling ADAS modules, a propulsion system, or a human-machine interface, and/or dashboard system. The other vehicle systems may use the useful vehicle parameters for various purposes including, but not limited to, improved real-time vehicle dynamics modeling, vehicle dynamics prediction, function limiting, driver messaging, and/or MRM prediction.

The physics-based mathematical model for the SbW use case may estimate vehicle yaw acceleration (e.g., which may be used to estimate maximum lateral vehicle capabilities) based on individual wheel brake force applies, estimated lateral forces in the front and rear tires, and/or estimated front roadwheel angle. The individual wheel brake force applies may be determined based on at least one of SbB brake commands, brake torque or pressure output, and vehicle tire parameters. The individual wheel brake force applies may be used to estimate front roadwheel angle. The estimated lateral forces in the front and rear tires may be calculated using a vehicle model with inputs of vehicle speed and estimated roadwheel angle.

The estimated roadwheel angular acceleration may be calculated based on a brake force moment, tire trail moment, and/or a resistance moment (e.g., which estimates the resistance to rotate the tire due to inertia of the system and friction). The brake force moment may depend on the estimated brake force applies and the wheel scrub radius. The tire trail moment may depend on the lateral front tire force and a dynamic trail estimate. The resistance moment may be modeled as a simple spring depending on the estimated roadwheel angle and a proportional spring constant. The resistance moment may also include a damping term depending on the roadwheel velocity and a damping constant. The estimated roadwheel angular acceleration may be integrated to estimate the roadwheel angular velocity. The estimated roadwheel angular velocity may be integrated to estimate roadwheel angle. Initial conditions may be included in the integration model by estimating the roadwheel angle under "normal" conditions prior to an event or a fault in the roadwheel actuator.

Additionally, or alternatively, the physics-based mathematical model may be used independently of a current brake-to-steer command. For example, the systems and methods described herein may be configured to estimate the maximum SbB capability in the left and right directions respectively to estimate a maximum lateral capability range of the system. A similar procedure with a separate vehicle model for a mechanically connected steering system may be used to estimate the instantaneous driver handwheel effort acceptable or unacceptable range.

The estimated roadwheel angle may be used to estimate the rack position based on the steering geometry. The model may take the derivative of the rack position to estimate rack velocity. The model may further take a derivative of the rack velocity to estimate rack acceleration. Additionally, or alternatively, the model may include a lateral acceleration-based camber thrust input to the roadwheel acceleration estimate, dynamic model parameter estimates based on longitudinal-acceleration dependent weight transfer estimates, and/or a dynamic brake torque coefficient estimate based on brake temperatures.

The significance of the model is that it may calculate many critical vehicle parameters, including an instantaneous SbB metric, without using a real-time steering wheel angle, rack position sensor input, and/or other position sensors inputs to estimate the roadwheel angle.

In some embodiments, the systems and methods described herein may be configured to compare the target metric to the instantaneous SbB metric to determine whether the target metric can be achieved while SbB is active. The systems and methods described herein may be configured to, if the target metric can be achieved, provide an SbB system status indicating that the requested maneuver can be safely executed. The status may be used to communicate sufficient SbB capability to the driver, and/or used to communicate sufficient SbB capability to other vehicle systems. The systems and methods described herein may be configured to provide ranges of SbB capability, which may be used to communicate maneuver limits to the driver. The driver may be informed of sufficient SbB capability through a multitude of different human-machine interaction interfaces, including, but not limited to, handwheel actuator steering feel, dashboard lights, dashboard messages, and/or audible indicators. The other vehicle systems may be informed of sufficient SbB capability, allowing for use of functions that enhance SbB performance, including, but not limited to, the propulsion system allowing the vehicle to accelerate, the dashboard indicating system providing different SbB feedback information, and/or an automated, autonomous, or software-controlled driving controller to provide a gradual minimum risk maneuver (MRM) with degraded lateral control, such as a lane change or pulling to the side of the road.

If the target metric cannot be achieved, the systems and methods described herein may be configured to provide a status indicating that the requested maneuver cannot be sufficiently executed. The status may be used to communicate insufficient SbB capability to the driver, and/or used to communicate insufficient SbB capability to other vehicle systems. The systems and methods described herein may be configured to provide ranges of SbB capability, which may be used to communicate the maneuver limits to the driver. The driver may be informed of insufficient SbB capability through a multitude of different human-machine interfaces, including, but not limited to handwheel actuator steering feel, dashboard lights, dashboard messages, and/or audible indicators. The other vehicle systems may be informed of insufficient SbB capability, allowing for the use of functions that help communicate insufficient vehicle capability to the driver and/or other drivers. The other vehicle systems may use functions to help the vehicle achieve a safer state while SbB capability is insufficient. Such functions may include the propulsion system limiting vehicle acceleration capability, the dashboard indicating system providing different SbB feedback information to the driver, an automated, autonomous, or software-controlled driving controller providing a different MRM, such as a stop in lane MRM due to insufficient SbB control, vehicle automatic lights systems automatically activating emergency lights, V2V or V2X systems communicating a faulted state with limited capability, tightening of seat belts, and/or the like.

In some embodiments, the systems and methods described herein may be configured to communicate performance capabilities, insufficiencies of SbB, and additional useful vehicle parameters to the driver and other vehicle systems, so the driver and other vehicle systems can make more informed decisions to enhance vehicle controllability and vehicle safe state decisions.

The systems and methods described herein may be configured to enhance SbB by such that the SbB function includes: improved human-machine interface capability (e.g., improved function interface with the driver); enhanced controllability and operability for the driver; improved integration with other vehicle systems; safer SbB use and more dynamic SbB operation state or modes when the capability of SbB is exceeded; and/or any other suitable function or improvement The systems and methods described herein may be configured to enhance other vehicle dynamics systems by providing additional useful vehicle information using a physics-based mathematical model, (e.g., for a SbW vehicle use case).

The systems and methods described herein may be configured to estimate roadwheel angle, roadwheel velocity, roadwheel acceleration, rack position, rack velocity, rack acceleration, and/or estimated rack force while the rack is healthy, degraded, faulted, or failed for a SbW system without knowing the rack position or steering ratio.

The systems and methods described herein may be configured to use a physics-based model to estimate vehicle yaw rate, roadwheel angle, roadwheel velocity, roadwheel acceleration, rack position, rack velocity, rack acceleration, and/or estimated rack force by estimating roadwheel angle based on wheel brake applies and other vehicle dynamics information.

In some embodiments, the systems and methods described herein may be configured to provide improved vehicle steering control. For example, the systems and methods described herein may be configured to estimate a target steering metric using at least one vehicle signal associated with a vehicle. The target steering metric may be associated with a requested steering maneuver. The target steering metric may include a maximum allowable handwheel effort, a desired lateral vehicle target, any other suitable metric, or a combination thereof.

The systems and methods described herein may be configured to estimate an instantaneous SbB metric using the at least one vehicle signal. The systems and methods described herein may be configured to estimate the instantaneous SbB metric using a physics-based mathematical model. The physics-based mathematical model may estimate at least one vehicle parameter that is provided to at least one vehicle dynamic system.

The systems and methods described herein may be configured to calculate a SbB capability status of a SbB function of a steering system of the vehicle. The instantaneous SbB metric may include an instantaneous driver handwheel effort during operation of the SbB function, an instantaneous SbB lateral vehicle capability, any other suitable metric, or a combination thereof.

The systems and methods described herein may be configured to determine whether the SbB function can achieve the target steering metric based on the target steering metric, the instantaneous SBB metric, and the SbB capability status. The systems and methods described herein may be configured to, in response to a determination that the SbB function can achieve the target steering metric, generate a first SbB capability indication. The systems and methods described herein may be configured to provide the first SbB capability indication. The first SbB capability indication may include a status indicating that at least one of the SbB function and the steering system can perform the requested steering maneuver, an estimated range for achieving the target steering metric, and other suitable information, or a combination thereof.

The systems and methods described herein may be configured to providing the first SbB capability indication by providing the first SbB capability indication to a display of the vehicle, and/or to at least one vehicle system of the vehicle.

The systems and methods described herein may be configured to, in response to a determination that the SbB function cannot achieve the target steering metric, generate a second SbB capability indication. The systems and methods described herein may be configured to provide the second SbB capability indication. The second SbB capability indication may include a status indicating that at least one of the SbB function and the steering system cannot perform the requested steering maneuver, an estimated range where the target steering metric cannot be achieved, and any other suitable information, or a combination thereof.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
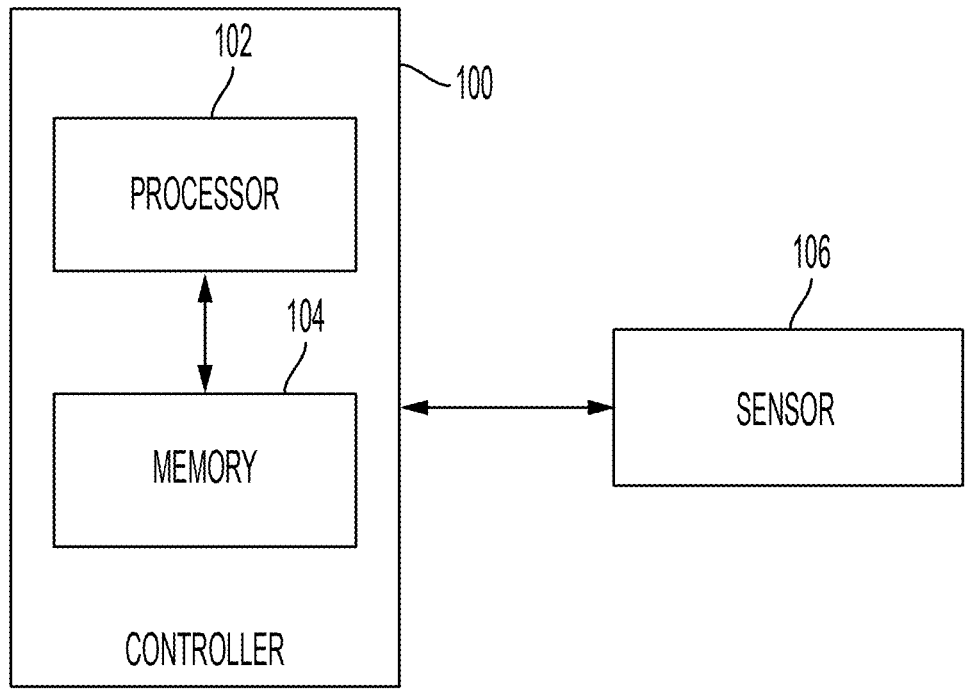
FIG. 2 generally illustrates a controller according to the principles of the present disclosure.

In some embodiments, the steering system may include a steering system controller, such as controller 100, as is generally illustrated in FIG. 2. The controller 100 may include any suitable controller. The controller 100 may be configured to control, for example, the various functions of the steering system. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various functions of the steering system.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angel, a motor velocity, a vehicle speed, other suitable information, or a combination thereof.

In some embodiment, the controller 100 may be configured to provide improved vehicle steering control. For example, the controller 100 may estimate a target steering metric using at least one vehicle signal associated with the vehicle 10. The target steering metric may be associated with a requested steering maneuver. The target steering metric may include a maximum allowable handwheel effort, a desired lateral vehicle target, any other suitable metric, or a combination thereof.

The controller 100 may estimate an instantaneous SbB metric using the at least one vehicle signal. The controller 100 may estimate the instantaneous SbB metric using a physics-based mathematical model. The physics-based mathematical model may estimate at least one vehicle parameter that is provided to at least one vehicle dynamic system.

The controller 100 may calculate a SbB capability status of a SbB function of a steering system of the vehicle 10. The instantaneous SbB metric may include an instantaneous driver handwheel effort during operation of the SbB function, an instantaneous SbB lateral vehicle capability, any other suitable metric, or a combination thereof.

The controller 100 may determine whether the SbB function can achieve the target steering metric based on the target steering metric, the instantaneous SBB metric, and the SbB capability status. The controller 100 may, in response to a determination that the SbB function can achieve the target steering metric, generate a first SbB capability indication. The controller 100 may provide the first SbB capability indication. The first SbB capability indication may include a status indicating that at least one of the SbB function and the steering system can perform the requested steering maneuver, an estimated range for achieving the target steering metric, and other suitable information, or a combination thereof.

The controller 100 may providing the first SbB capability indication by providing the first SbB capability indication to a display of the vehicle 10, and/or to at least one vehicle system of the vehicle 10.

The controller 100 may, in response to a determination that the SbB function cannot achieve the target steering metric, generate a second SbB capability indication. The controller 100 may provide the second SbB capability indication. The second SbB capability indication may include a status indicating that at least one of the SbB function and the steering system cannot perform the requested steering maneuver, an estimated range where the target steering metric cannot be achieved, and any other suitable information, or a combination thereof.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 6:
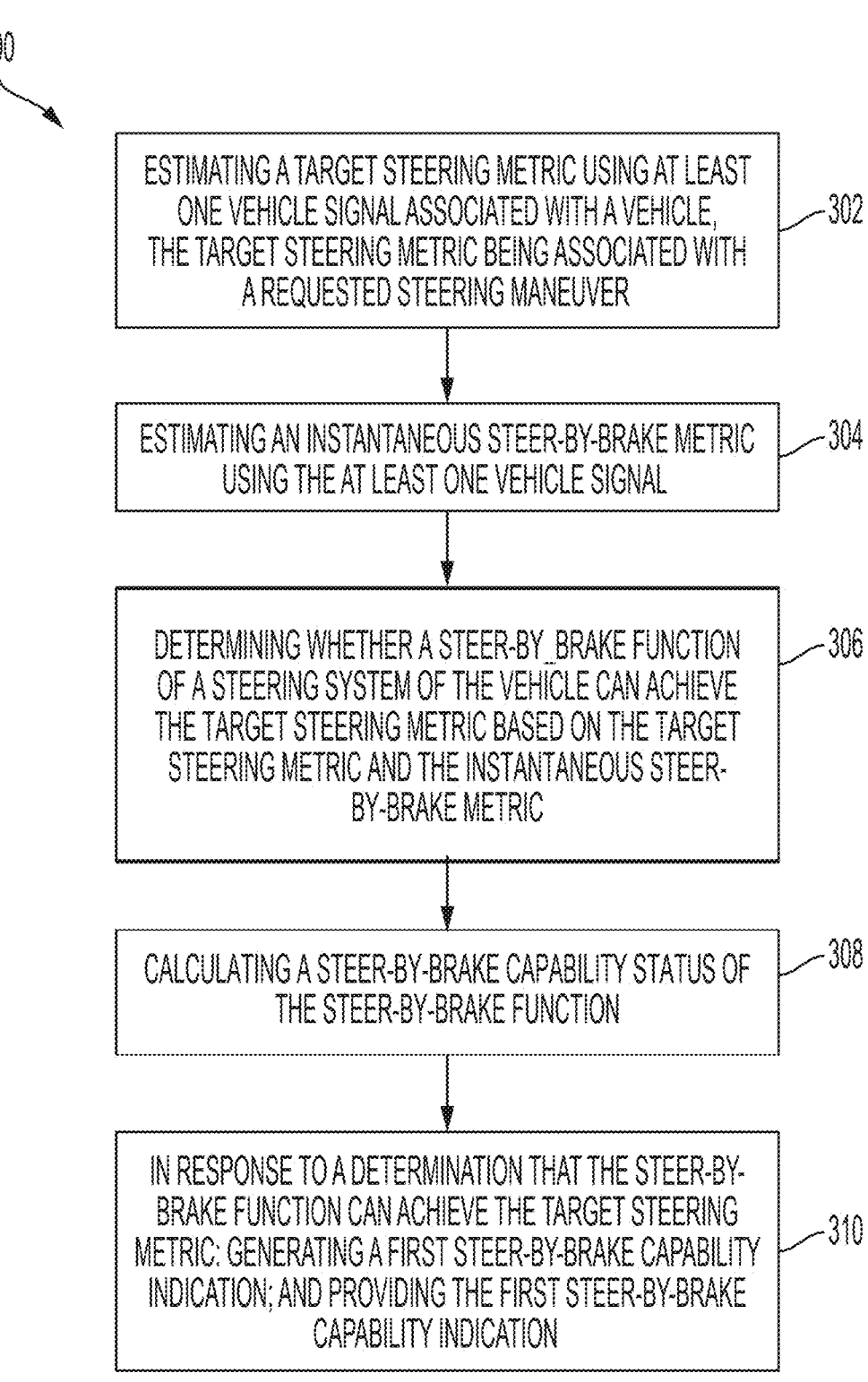
FIG. 6 is a flow diagram generally illustrating a vehicle steering control method according to the principles of the present disclosure.

FIG. 6 is a flow diagram generally illustrating a vehicle steering control method 300 according to the principles of the present disclosure. At 302, the method 300 estimates a target steering metric using at least one vehicle signal associated with a vehicle. The target steering metric may be associated with a requested steering maneuver.

At 304, the method 300 estimates an instantaneous SbB metric using the at least one vehicle signal.

At 306, the method 300 determines whether a SbB function of a steering system of the vehicle can achieve the target steering metric based on the target steering metric, the instantaneous SbB metric, and the SbB capability status.

At 308, the method 300 calculates a SbB capability status of the SbB function.

At 310, the method 300, in response to a determination that the SbB function can achieve the target steering metric generates a first SbB capability indication, and provides the first SbB capability indication.

In some embodiments, a method for vehicle steering control includes estimating a target steering metric using at least one vehicle signal associated with a vehicle, the target steering metric being associated with a requested steering maneuver. The method also includes estimating an instantaneous steer-by-brake metric using the at least one vehicle signal, determining whether a steer-by-brake function of a steering system of the vehicle can achieve the target steering metric based on the target steering metric and the instantaneous steer-by-brake metric, and calculating a steer-by-brake capability status of the steer-by-brake function. The method also includes, in response to a determination that the steer-by-brake function can achieve the target steering metric generating a first steer-by-brake capability indication, and providing the first steer-by-brake capability indication.

In some embodiments, the first steer-by-brake capability indication includes a status indicating that at least one of the steer-by-brake function and the steering system can perform the requested steering maneuver. In some embodiments, the first steer-by-brake capability indication includes an estimated range for achieving the target steering metric. In some embodiments, providing the first steer-by-brake capability indication includes providing the first steer-by-brake capability indication to a display of the vehicle. In some embodiments, providing the first steer-by-brake capability indication includes providing the first steer-by-brake capability indication to at least one vehicle system of the vehicle. In some embodiments, the method also includes, in response to a determination that the steer-by-brake function cannot achieve the target steering metric, generating a second steer-by-brake capability indication, and providing the second steer-by-brake capability indication. In some embodiments, in the second steer-by-brake capability indication includes a status indicating that at least one of the steer-by-brake function and the steering system cannot perform the requested steering maneuver. In some embodiments, the second steer-by-brake capability indication includes an estimated range where the target steering metric cannot be achieved. In some embodiments, the target steering metric includes at least one of a maximum allowable handwheel effort and a desired lateral vehicle target. In some embodiments, the instantaneous steer-by-brake metric includes at least one of an instantaneous driver handwheel effort during operation of the steer-by-brake function, and an instantaneous steer-by-brake lateral vehicle capability. In some embodiments, estimating the instantaneous steer-by-brake metric using the at least one vehicle signal includes using a physics-based mathematical model. In some embodiments, the physics-based mathematical model estimates at least one vehicle parameter that is provided to at least one vehicle dynamic system.

In some embodiments, a system for vehicle steering control includes a processor, and a memory. The memory includes instructions that, when executed by the processor cause the processor to: estimate a target steering metric using at least one vehicle signal associated with a vehicle, the target steering metric being associated with a requested steering maneuver; estimate an instantaneous steer-by-brake metric using the at least one vehicle signal; determine whether a steer-by-brake function of a steering system of the vehicle can achieve the target steering metric based on the target steering metric and the instantaneous steer-by-brake metric; calculate a steer-by-brake capability status of the steer-by-brake function; and, in response to a determination that the steer-by-brake function can achieve the target steering metric: generate a first steer-by-brake capability indication; and provide the first steer-by-brake capability indication.

In some embodiments, the first steer-by-brake capability indication includes a status indicating that at least one of the steer-by-brake function and the steering system can perform the requested steering maneuver. In some embodiments, the first steer-by-brake capability indication includes an estimated range for achieving the target steering metric. In some embodiments, the instructions further cause the processor to provide the first steer-by-brake capability indication by providing the first steer-by-brake capability indication to a display of the vehicle. In some embodiments, the instructions further cause the processor to provide the first steer-by-brake capability indication includes providing the first steer-by-brake capability indication to at least one vehicle system of the vehicle. In some embodiments, the instructions further cause the processor to, in response to a determination that the steer-by-brake function cannot achieve the target steering metric: generate a second steer-by-brake capability indication; and provide the second steer-by-brake capability indication. In some embodiments, the second steer-by-brake capability indication includes at least one of a status indicating that at least one of the steer-by-brake function and the steering system cannot perform the requested steering maneuver, and an estimated range where the target steering metric cannot be achieved.

In some embodiments, an apparatus for vehicle steering control includes a controller configured to: estimate a target steering metric using at least one vehicle signal associated with a vehicle, the target steering metric being associated with a requested steering maneuver; estimate an instantaneous steer-by-brake metric using the at least one vehicle signal; determine whether a steer-by-brake function of a steering system of the vehicle can achieve the target steering metric based on the target steering metric and the instantaneous steer-by-brake metric; calculate a steer-by-brake capability status of the steer-by-brake function; in response to a determination that the steer-by-brake function can achieve the target steering metric, generate a first steer-by-brake capability indication; and, in response to a determination that the steer-by-brake function cannot achieve the target steering metric, generate a second steer-by-brake capability indication.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, opti-cal, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A method for vehicle steering control, the method comprising:
   estimating a target steering metric using at least one vehicle signal associated with a vehicle, the target steering metric being associated with a requested steering maneuver;
   estimating an instantaneous steer-by-brake metric using the at least one vehicle signal;
   determining whether a steer-by-brake function of a steering system of the vehicle can achieve the target steering metric based on the target steering metric and the instantaneous steer-by-brake metric;
   calculating a steer-by-brake capability status of the steer-by-brake function based on a current operating state of the steer-by-brake function and the requested steering maneuver, and
   in response to a determination that the steer-by-brake function can achieve the target steering metric:
      generating a first steer-by-brake capability indication; and
      providing the first steer-by-brake capability indication.

2. The method of claim 1, wherein the first steer-by-brake capability indication includes a status indicating that at least one of the steer-by-brake function and the steering system can perform the requested steering maneuver.

3. The method of claim 1, wherein the first steer-by-brake capability indication includes an estimated range for achieving the target steering metric.

4. The method of claim 1, wherein providing the first steer-by-brake capability indication includes providing the first steer-by-brake capability indication to a display of the vehicle.

5. The method of claim 1, wherein providing the first steer-by-brake capability indication includes providing the first steer-by-brake capability indication to at least one vehicle system of the vehicle.

6. The method of claim 1, further comprising, in response to a determination that the steer-by-brake function cannot achieve the target steering metric:
   generating a second steer-by-brake capability indication; and
   providing the second steer-by-brake capability indication.

7. The method of claim 6, wherein the second steer-by-brake capability indication includes a status indicating that at least one of the steer-by-brake function and the steering system cannot perform the requested steering maneuver.

8. The method of claim 6, wherein the second steer-by-brake capability indication includes an estimated range where the target steering metric cannot be achieved.

9. The method of claim 1, wherein the target steering metric includes at least one of a maximum allowable hand-wheel effort and a desired lateral vehicle target.

10. The method of claim 1, wherein the instantaneous steer-by-brake metric includes at least one of an instantaneous driver handwheel effort during operation of the steer-by-brake function, and an instantaneous steer-by-brake lateral vehicle capability.

11. The method of claim 1, wherein estimating the instantaneous steer-by-brake metric using the at least one vehicle signal includes using a physics-based mathematical model.

12. The method of claim 11, wherein the physics-based mathematical model estimates at least one vehicle parameter that is provided to at least one vehicle dynamic system.

13. The system of claim 6, wherein the second steer-by-brake capability indication includes at least one of a status indicating that at least one of the steer-by-brake function and the steering system cannot perform the requested steering maneuver, and an estimated range where the target steering metric cannot be achieved.

14. A system for vehicle steering control, the system comprising:

a processor; and a memory including instructions that, when executed by the processor cause the processor to:

estimate a target steering metric using at least one vehicle signal associated with a vehicle, the target steering metric being associated with a requested steering maneuver;

estimate an instantaneous steer-by-brake metric using the at least one vehicle signal;

determine whether a steer-by-brake function of a steering system of the vehicle can achieve the target steering metric based on the target steering metric and the instantaneous steer-by-brake metric;

calculate a steer-by-brake capability status of the steer-by-brake function based on a current operating state of the steer-by-brake function and the requested steering maneuver; and in response to a determination that the steer-by-brake function can achieve the target steering metric:

generate a first steer-by-brake capability indication; and provide the first steer-by-brake capability indication.

15. The system of claim 14, wherein the first steer-by-brake capability indication includes a status indicating that at least one of the steer-by-brake function and the steering system can perform the requested steering maneuver.

16. The system of claim 14, wherein the first steer-by-brake capability indication includes an estimated range for achieving the target steering metric.

17. The system of claim 14, wherein the instructions further cause the processor to provide the first steer-by-brake capability indication by providing the first steer-by-brake capability indication to a display of the vehicle.

18. The system of claim 14, wherein the instructions further cause the processor to provide the first steer-by-brake capability indication includes providing the first steer-by-brake capability indication to at least one vehicle system of the vehicle.

19. The system of claim 14, wherein the instructions further cause the processor to, in response to a determination that the steer-by-brake function cannot achieve the target steering metric:

generate a second steer-by-brake capability indication; and provide the second steer-by-brake capability indication.

20. An apparatus for vehicle steering control, the apparatus comprising:

a controller configured to:

estimate a target steering metric using at least one vehicle signal associated with a vehicle, the target steering metric being associated with a requested steering maneuver;

estimate an instantaneous steer-by-brake metric using the at least one vehicle signal;

determine whether a steer-by-brake function of a steering system of the vehicle can achieve the target steering metric based on the target steering metric and the instantaneous steer-by-brake metric;

calculate a steer-by-brake capability status of the steer-by-brake function based on a current operating state of the steer-by-brake function and the requested steering maneuver;

in response to a determination that the steer-by-brake function can achieve the target steering metric, generate a first steer-by-brake capability indication; and in response to a determination that the steer-by-brake function cannot achieve the target steering metric, generate a second steer-by-brake capability indication.

* * * * *